Figure 1:
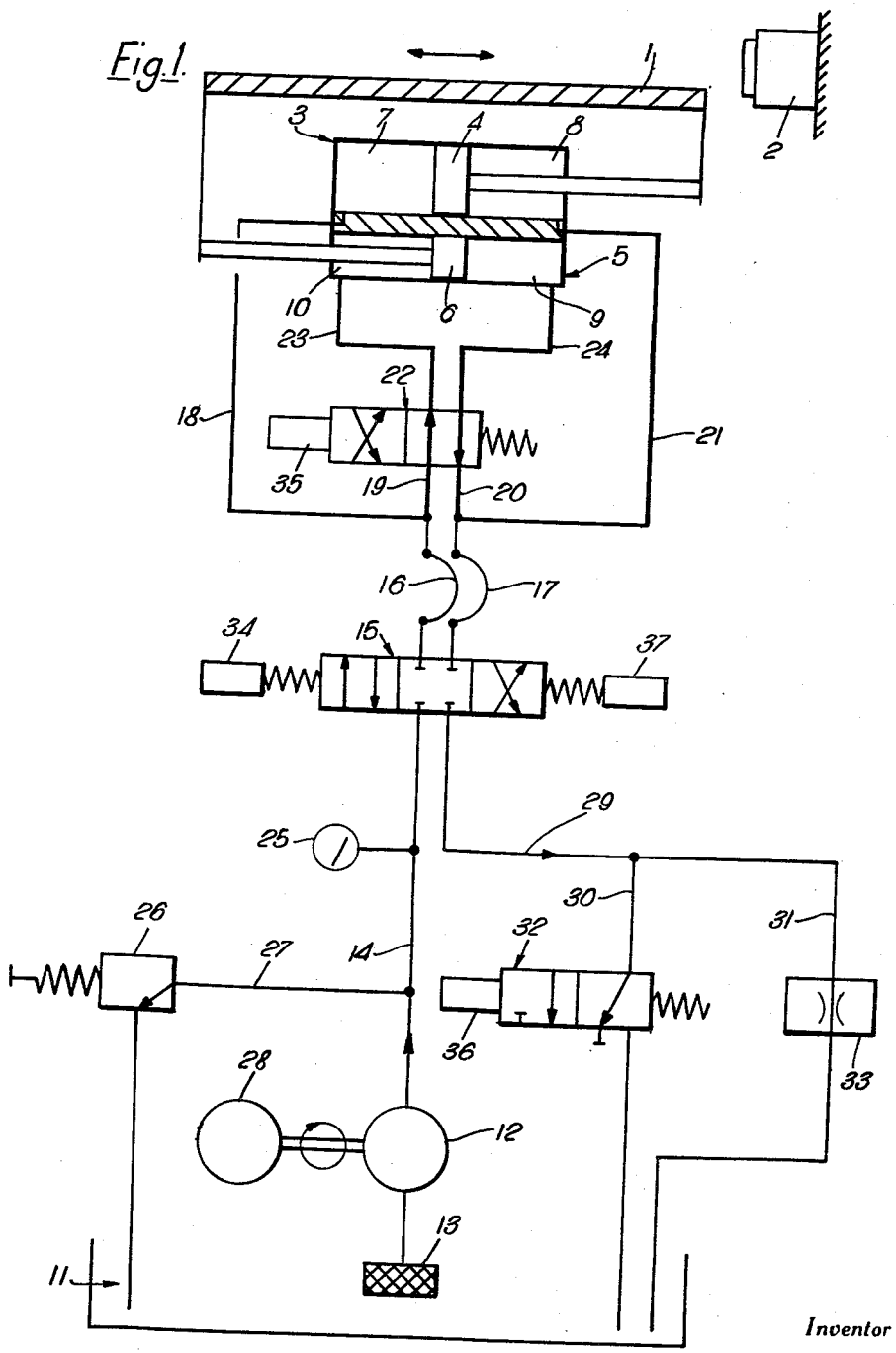

March 2, 1965  W. D. SAMUEL  3,171,331
CONTROL APPARATUS
Filed Dec. 26, 1963  2 Sheets-Sheet 1

Inventor
WALTER DANIEL SAMUEL
By Bacon & Thomas
Attorneys

March 2, 1965  W. D. SAMUEL  3,171,331
CONTROL APPARATUS
Filed Dec. 26, 1963   2 Sheets-Sheet 2
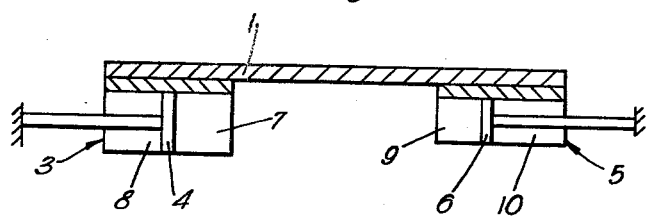
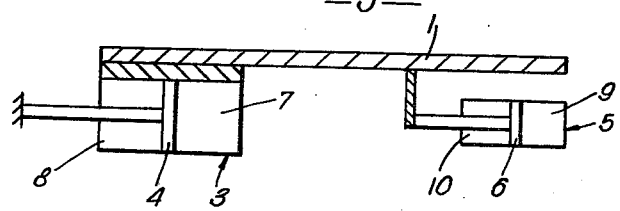
Inventor
WALTER DANIEL SAMUEL
By Bacon & Thomas
Attorneys

United States Patent Office 3,171,331
Patented Mar. 2, 1965

3,171,331
CONTROL APPARATUS
Walter Daniel Samuel, Hemel Hempstead, England,
assignor to Centec Machine Tools Limited, Hemel
Hempstead, England, a British company
Filed Dec. 26, 1963, Ser. No. 333,583
Claims priority, application Great Britain, Jan. 2, 1963,
269/63
13 Claims. (Cl. 91—414)

This invention relates to control apparatus for controlling the relative movement of parts in machinery. The invention is particularly directed to the provision of new or improved control apparatus for use in machinery of the kind in which relative movement is to be effected between two such parts and where such relative movement includes two phases, namely one in which the parts are to be moved relatively to one another at a comparatively high speed and another in which the speed of such relative movement is to be comparatively small.

Relative movement of this kind is required in a very wide variety of machinery, particularly where one of such parts is a support for a work-piece upon which some operation is to be performed and the other is a tool, or a support therefor, for carrying out such operation. In such an arrangement, a typical sequence of a simple operation would comprise the positioning of a work-piece and a tool on their supports whilst the latter are remote from one another, the relative approach of the tool and work-piece at a comparatively high speed to a position where operation on the work-piece may be commenced, relative movement of the tool and work-piece at a comparatively slow speed whilst such operation is carried out, and relative withdrawal of tool and work-piece to their starting positions. Such a sequence could of course be considerably expanded by the inclusion of additional withdrawal and approach movements to permit alteration of the position of the work-piece, the fitting of different tools, and so one, but it will be understood that one of the main requirements in operations of this kind is that means must be provided to enable the tool and work-piece to be moved relatively to one another at sequentially high and low speeds with a minimum of delay.

Such relative movement of a tool and a work-piece is, as already mentioned, required in a wide variety of machinery and particularly in metal cutting and forming apparatus such as milling, drilling, boring, cutting and turning machinery as well as presses of all kinds, and indeed in virtually all machine tools where relative movement is effected between a tool and a work-piece, and it is to this wide field that the control apparatus of the present invention is especially applicable.

A number of hydraulically controlled mechanisms are known for controlling the movement of a tool or work-piece support relatively to the other of such parts, which is generally stationary, and for effecting either comparatively high-speed relative movement (hereinafter referred to as "traverse" motion) or comparatively low-speed movement (hereinafter called "feed" motion).

In one arrangement the tool or work-piece support is moved by a hydraulic cylinder and piston arrangement, primary drive being provided by a hydraulic pump having sufficient capacity to provide fast traverse motion using all the oil delivered. In its simplest form such a circuit has a pump taking oil from the reservoir, the pressure of the delivered oil being regulated by a relief valve after which it passes to a directional valve. This valve delivers the oil to one side of the cylinder or the other, depending on the direction of motion required. The exhaust oil from this valve either passes straight to tank in the case of fast traverse motion, or is metered through a flow control valve to provide the controlled feed motion.

An alternative method of providing the feed motion is to meter the oil before the directional valve, so that the oil is metered into the cylinder instead of out of the cylinder.

The disadvantage of this system is that during feed motion, if the latter is required to be at a velocity of, say, $\frac{1}{400}$ as high as the fast traverse velocity then only $\frac{1}{400}$ of the volume the pump is delivering is actually required. The remainder of the oil passes through the relief valve straight back to tank in a short circuit and this results in considerable production of heat. There is therefore a waste of energy, necessitating a greater electric input and necessitating a large oil reservoir for heat dissipation.

A better method is to utilise two hydraulic pumps, one of which delivers a large volume at a low pressure and the other a small volume at high pressure. In this system the output from the large pump at low pressure is used for the fast traverse motion, and may or may not use the output from the small volume pump as well. For feed motion only the output from the small pump is used, the large pump being relieved of all work. This system is much more efficient from the energy input point of view and it also does not create excessive heat during feed motions. It also allows a smaller electric input to be employed. A disadvantage of this system, however, lies in the complications of the circuit and the necessary expense of two pumps and all the control gear.

Alternatively, it is possible to use a variable displacement pump in a similar system. In this case the pump would be set to deliver the maximum volume for fast traverse and the pump output would be reduced by an alteration in its displacement for the feed motion. This system again is efficient and does not suffer from energy waste. A disadvantage is that it is usually not possible to obtain the ratio of fast traverse to feed which is ideal. A further disadvantage is in the capital cost, which is high for variable displacement pumps.

Finally, it is possible to use a variable displacement pump in a system where the tool or work-piece support is moved by a variable consumption hydraulic motor driving a leadscrew. This system is again efficient, and has the further advantage that a larger ratio between fast traverse and feed can be achieved by using the pump at maximum displacement setting in conjunction with the hydraulic motor at minimum consumption setting for fast traverse. A disadvantage is, however, that the output from the hydraulic motor will be partially at constant horse power and partially at constant torque, whereas in machinery of the kind in question a constant torque output is generally required.

It is an object of the present invention to provide control apparatus in which all of the above disadvantages are overcome or considerably reduced.

Thus, according to the invention there is provided control apparatus for controlling the movement of a part in a machine at either of two different speeds, comprising two cylinder and piston assemblies of each of which either the piston or the cylinder is connectible to said part with such assemblies in substantial alignment with the desired direction of movement of the latter, means whereby working fluid may be fed from a reservoir at a constant volume rate either to a first combination of one face of one piston and one face of the other piston which will both urge said part in the same direction, or to a second combination of one face of one piston and one face of the other piston which will urge said part in opposite directions, the pair of piston faces acted upon by the working fluid in said second combination being of mutually different effective areas and being so arranged that the total effect of operation on said second combination is to move said part in the same direction as in said first combination but at a different speed from that produced by the latter.

Means will, of course, be provided for returning working fluid to the reservoir when it is expelled from said cylinder and piston assemblies during operation and preferably, and in accordance with a further feature of the invention, means may be provided, for example in the form of a metering device, for controlling the return flow of working fluid expelled from the assemblies upon operation in said first combination.

When working fluid is fed to said second combination of piston faces the speed of movement of said part effected thereby will be dependent on the difference in the effective areas of the piston faces concerned and, as working fluid is fed thereto at a constant volume rate, such speed will be inversely proportional to the difference in such effective areas. Thus if such difference is very small the machine part will be caused to move at a correspondingly high speed in order to accommodate the constant volume of working fluid which is being fed to that piston face which has the larger effective area, in each unit of time. Theoretically the speed of movement of said part would tend to infinity as the difference in the effective areas of the relevant piston faces tended to zero, although no movement would of course be produced if the faces were of the same effective area; in practice, however, the speed attainable is limited as the resultant pressure of working fluid on the larger piston face tends to zero simultaneously with the difference between the effective piston areas, and such pressure must of course be maintained above a certain minimum in order to overcome friction.

On the other hand, when working fluid is fed to the said first combination of piston faces the consequent speed of movement of the machine part is comparatively low as the part is urged in the same direction by both assemblies and the working fluid is thus acting directly on the combined areas of the piston faces concerned.

It will thus be seen that the feeding of working fluid to said first combination of piston faces produces a slow movement of said machine part, whilst feeding of fluid to the second combination causes fast movement thereof. Thus, in practice, said first combination may be employed to obtain a slow, controllable, feed motion of the part whilst the second combination provides for fast traverse motion in the same direction. The invention thus provides, in its simplest form, means for moving a support for a tool or work-piece, for example, either comparatively quickly or comparatively slowly in a single direction.

It will, however, be understood that two further combinations of one face of one piston with one face of the other piston are available in the apparatus. Very conveniently, and in accordance with a further feature of the invention, means will be provided for employing one of said two further combinations of piston faces, being of mutually different effective areas and hereinafter being referred to as the third combination thereof, in a similar manner to said second combination but in such fashion as, in combination, to urge said machine part in the direction opposite to said second combination. In this form the apparatus of the invention will provide, in addition to the means for causing fast traverse and slow feed motion of the machine part in a single direction as already mentioned, means for causing fast traverse motion of such part in the opposite direction.

Preferably, and in accordance with yet another feature of the invention, the difference between the effective areas of the pairs of piston faces of said second and third combinations respectively will be the same, with the result that the speed of fast traverse motion of the machine part will be the same in both directions.

Clearly, the one remaining combination of piston faces may also be employed to provide for slow feed motion in the opposite direction from that produced by said first combination. Thus, means may be provided for employing the remaining combination of piston faces, i.e. the fourth combination, in a similar manner to said first combination but in such fashion as to urge said machine part in the direction opposite to that caused by said first combination. Conveniently the sums of the effective areas of the pairs of piston faces of the said first and fourth combinations respectively will be the same, with the result that the speed of slow feed motion of the machine part will be the same in both directions.

As will be further explained hereinafter, the cylinder and piston assemblies may, in operation, be connected to the said machine part in any of a number of alternative arrangements. Thus, either both pistons may be connected to such part whilst the cylinders are fixedly mounted on a stationary part of the machine or some other convenient structure, or the cylinders may be so connected and the pistons fixed, or even, if desired, the piston of one assembly and the cylinder of the other may be connected to the said machine part whilst the corresponding cylinder and piston are secured against movement.

The feeding of working fluid to the assemblies is conveniently effected through suitable combinations of two-way valves which are arranged to feed fluid to any of the two, three or four combinations of piston faces in use in any particular form of the invention. During fast traverse motion the fluid expelled from the assemblies may be returned direct to the reservoir but, as already mentioned, a metering device is preferably included in the slow feed motion circuit so that the speed of such motion may be manually or automatically controlled to a fine degree. Preferably the delivery of working fluid to the combinations of piston faces is controlled by two valve assemblies, the arrangement of which is such that one such assembly controls the direction of movement of said part whilst the other controls its speed.

If desired, the controls for the apparatus, e.g. for adjusting the above-mentioned two-way valves, may be arranged for manual operation but the apparatus may be operated partially or fully automatically by means of microswitches, for example, controlled by the movement of said machine part so as to change the motion thereof from fast traverse to slow feed and vice versa when required, such switches being arranged to operate solenoids which control the various two-way valves.

The apparatus can be employed to control movement of a machine part in any direction between the horizontal and the vertical with equal ease, and could in fact control rotary movement, although the latter would require the incorporation of linkages for converting linear to rotary movement.

In order that the invention may be more readily understood, one embodiment of the same, together with two alternative arrangements, will now be described by way of example and with reference to the accompanying drawings, in which:

FIG. 1 shows, in diagrammatic form, the arrangement of a preferred embodiment of the invention; and FIGS. 2 and 3 show two alternative arrangements of the cylinder and piston assemblies within the scope of the invention.

The embodiment of the control apparatus shown in FIG. 1 is particularly adapted for the control of a machine part in the form of a work-supporting table 1 in a machine tool, e.g. a milling machine, which table is to carry a work-piece and be moved at high traverse speeds and low feed speeds relatively to a fixed tool support 2 which will carry a tool for operating on the work-piece. It will, of course, be understood that the control apparatus could control movement of the machine part constituted by the tool support 2 if the latter were to be movable and the work table 1 fixed.

The control apparatus comprises two cylinder and piston assemblies comprising, respectively, a cylinder 3 having a piston 4 and a cylinder 5 having a piston 6. The cylinder 3 is divided by piston 4 into two spaces 7 and 8, and the cylinder 5 is similarly divided into spaces 9 and 10, whilst the respective piston rods are connected one to each end of the work table 1.

In this embodiment the working fluid is in the form of oil stored in an oil reservoir 11 from which it is drawn by a pump 12 by way of an oil filter 13, the pump 12 being of the kind which maintains the flow of oil at a constant volume rate. From the pump 12 an oil flow line 14 leads to a first four-way valve assembly 15 from which extend two further lines 16 and 17. The line 16 divides into further lines 18 and 19 and the line 17 into lines 20 and 21. The line 18 goes to the cylinder space 7 and the line 21 to cylinder space 8, whilst the lines 19 and 20 lead to a second four-way valve assembly 22 from which further lines 23 and 24 lead to the cylinder spaces 10 and 9 respectively.

A pressure gauge 25 is provided in the line 14 and a relief valve 26 is provided in a line 27 leading from a point in the line 14 downstream of the pump 12 to the oil reservoir 11. The pump 12 is driven by an electric motor 28.

From the valve assembly 15 extends a return flow line 29 which divides into lines 30 and 31 which lead back to the oil reservoir via a stop valve 32 and flow control valve 33 respectively.

The valve assemblies 15 and 22 provide means for delivery of oil at a constant volume rate to any of the four combinations of two piston faces (one from each piston) present in the apparatus, from the line 14.

Thus, assuming the valve assembly 22 to be in its illustrated position and the valve assembly 15 to be set in its "straight-through" position by operation of a solenoid 34, oil will be delivered to cylinder spaces 7 and 10, i.e. to the combination of the left-hand ends of pistons 4 and 6. It will be seen that the delivery of pressure fluid to these spaces will cause both pistons to move to the right and thus urge the work table 1 in the same direction; the combination of the left-hand faces of pistons 4 and 6 thus constitutes the "first combination" as referred to hereinbefore. Upon movement of the pistons, oil in the spaces 8 and 9 is expelled through lines 24, 20 and 21 to line 17 and thence straight through the right-hand side of valve assembly 15 to line 29. Stop valve 32 being closed as shown, the oil then passes through flow control valve 33 to the reservoir.

The aforementioned "second combination" of piston faces is constituted by the left-hand face of piston 4 and the right-hand face of piston 6, and to make use of this combination oil is fed to spaces 7 and 9 by operating a solenoid 35 to lead oil from line 16 through, on the one hand, line 18 and, on the other hand, lines 19 and 24. The effective area of the left-hand face of piston 4 is slightly larger than that of the right-hand face of piston 6 and thus, although the pistons 4 and 6 will be urged to the right and left respectively to urge the work table 1 in opposite directions, the resultant effect, since the pump is delivering a constant volume of oil per unit of time, will be to urge the work table to the right at a comparatively high speed dependent, as explained hereinbefore, on the difference in the effective areas of the said piston faces.

Operation of solenoid 35 is arranged to cause simultaneous operation of a solenoid 36 to open the stop valve 32 and thus, when the work table moves to the right as described above, oil is expelled from cylinder space 8 via lines 21, 17, 29 and 30 direct to the reservoir.

The apparatus so far described constitutes the simplest form of the invention, as mentioned previously, in which provision is only made for moving a machine part (in this case the work table) to the right at either high or low speed. It will be understood that to carry out such operations no adjustment of valve 15 from its "straight-through" position is necessary and the "crossover" position of valve 15 (brought into operation by a solenoid 37) can be dispensed with.

However, in the majority of machines it will be necessary to provide, in addition, at least for fast traverse motion of the work table to the left and this is accomplished by operating solenoids 37 and 35 so that oil passes from line 14 along lines 17, 20 and 23 on the one hand and lines 17 and 21 on the other hand to cylinder spaces 10 and 8 respectively, to act on the left-hand face of piston 6 and the right-hand face of piston 4 respectively. The effective area of the latter face being slightly greater than that of the former, the work table 1 is caused to move to the left at high speed. This combination of piston faces thus constitutes the "third combination" already mentioned.

The only remaining combination of piston faces is that formed by the right-hand faces of both pistons, constituting the aforementioned "fourth combination." Oil is led to these faces by operating solenoid 37 but maintaining valve assembly 22 in its illustrated condition, whereby oil is fed to spaces 8 and 9 to cause slow feed motion of the work table to the left.

It will be understood that, in movement of the work table to the left, the oil expelled from the cylinders takes the same paths back to the reservoir as in corresponding fast and slow movement of the table to the right.

It will thus be seen that the apparatus provides means for moving the work table in either direction at high or low speed. Thus, assuming the work table to start at its extreme leftward position, a work-piece will be mounted on it and the table then moved at high speed to the right to bring the work-piece into close proximity with a tool, such as a rotary cutter for example, carried by the tool support 2; the motion of the table will then be changed from fast traverse to slow feed to perform the desired operation on the work-piece; the operation being completed the table will be traversed at high speed to the left to a position where the work-piece may be released therefrom. Slow feed of the table to the left may be employed if necessary during the cutting operation or, of course, if a further work-piece is provided at the left-hand end of the work table.

It will be understood that the valve assembly 15 controls change-over between left-to-right and right-to-left movement of the work table, whilst the assembly 22 provides for changes from fast traverse to slow feed motion and vice versa.

The flow control valve 33 will generally be manually operable and the relief valve 26 is arranged to be operated in conjunction therewith so that when the flow control valve is throttled down for very slow feed motion the relief valve will be opened to pass a proportion of the output of the pump 12 back to the reservoir.

As already mentioned, the operation of the apparatus may be made partially or fully automatic by the provision of suitable micro-switches operable by movement of the controlled machine part to actuate the valve assemblies 15 and 22.

The said valve assemblies could, however, be hydraulically or manually operated if desired.

Preferably the arrangement will be such that the speeds of fast traverse and slow feed of the controlled machine part, respectively, will be the same for both directions of movement. This may clearly be achieved by making the difference between the effective areas of the left and right-hand sides, on the one hand, and the right and left-hand sides, on the other hand, of pistons 4 and 6 respectively, the same to achieve similar speeds for fast traverse, and the sums of the effective areas of their left-hand sides and right-hand sides respectively the same to achieve similar speeds for slow feed.

The cylinders 3 and 5 need not, of course, be mounted in conjunction as shown but may, indeed be placed in any positions where they can effectively control the movement of the controlled machine part. Moreover, the invention is not limited to the pistons of the cylinder and piston assemblies being connected to the controlled part. FIG. 2 shows an arrangement in which the cylinders are connected to the controlled part 1 whilst the pistons 4 and 6 have their rods fixedly secured to some convenient stationary part of the machine, the cylinders 3 and 5, and the spaces therein corresponding to those of FIG. 1 being similarly designated; the arrangement of the oil feed lines to the various cylinder parts will also correspond to FIG. 1 and is not therefore illustrated.

Another variation is shown in FIG. 3, in which the cylinder 3 is secured to the controlled part and has its piston fixed, whilst the cylinder 5 is fixed as in FIG. 1 and has its piston 6 secured to the controlled part.

It will thus be seen that the invention provides control apparatus in which the disadvantages of those known mechanisms mentioned hereinbefore are overcome or considerably reduced. The invention makes it possible to provide any desired ratio between traverse and feed speeds, and does not suffer from energy wastage and consequent heat production. It allows a small electrical input to generate the required performance in an efficient manner, and the capital cost of the apparatus is, moreover, comparatively small as only a small constant volume pump, requiring a small electric motor and necessitating a small oil reservoir and simple control valves is needed.

I claim:

1. In a machine tool having a support for a work-piece and a support for a tool, control apparatus for controlling the movement of one of said supports at either of two different speeds, comprising: two cylinder and piston assemblies of each of which either the piston or the cylinder is connected to said support with such assemblies in substantial alignment with the desired direction of movement of the support; a working fluid reservoir; means whereby working fluid may be fed from said reservoir at a constant volume rate to a first combination of one face of one piston and one face of the other piston which will both urge said support in the same direction; and means whereby working fluid may be fed from said reservoir at a constant volume rate to a second combination of one face of one piston and one face of the other piston which will urge said support in opposite directions; the pair of piston faces acted upon by the working fluid in said second combination being of mutually different effective areas and being so arranged that the total effect of operation on said second combination is to move said support in the same direction as in said first combination but at a different speed from that produced by the latter.

2. Apparatus according to claim 1, including metering means for controlling the return flow of working fluid expelled from the assemblies upon operation on said first combination.

3. Apparatus according to claim 1, wherein the difference between the effective areas of the pair of piston faces of said second combination is small compared with the sum of the effective areas of the pair of piston faces of said first combination, whereby operation on said second combination causes movement of said support at a speed substantially greater than does operation on said first combination.

4. Apparatus according to claim 1, including means whereby working fluid may be fed from said reservoir at a constant volume rate to a third combination of one face of one piston and one face of the other piston which will urge said support in opposite directions, the piston faces of such third combination being of mutually different effective areas and being so arranged that the total effect of operation on such third combination is to move said support in the opposite direction from said first combination but at a different speed from that produced by the latter.

5. Apparatus according to claim 4, including means whereby working fluid may be fed from said reservoir at a constant volume rate to a fourth combination of one face of one piston and one face of the other piston which will both urge said support in the same direction, such direction being opposite to the direction of movement produced by operation on said first combination.

6. Apparatus according to claim 5, wherein the difference between the effective areas of the pair of piston faces of said third combination is small compared with the sum of the effective areas of the pair of piston faces of said fourth combination, whereby operation on said third combination causes movement of said support at a speed substantially greater than operation on said fourth combination.

7. Apparatus according to claim 4, wherein the difference between the effective areas of the pair of piston faces of said second combination is the same as the difference between the effective areas of the pair of piston faces of said third combination, whereby the speed of movement of said support produced by operation on such second and third combination of piston faces is the same.

8. Apparatus according to claim 5, wherein the sum of the effective areas of the pair of piston faces of said first combination is the same as the sum of the effective areas of the pair of piston faces of said fourth combination, whereby the speed of movement of said support produced by operation on said first and fourth combinations of piston faces is the same.

9. Apparatus according to claim 5, including two valve assemblies adapted to control the delivery of working fluid to the combinations of piston faces, the arrangement of such valve assemblies being such that one assembly controls the direction of movement of said support whilst the other controls its speed.

10. Apparatus according to claim 3, including means whereby working fluid may be fed from said reservoir at a constant volume rate to a third combination of one face of one piston and one face of the other piston which will urge said support in opposite directions, the piston faces of such third combination being of mutually different effective areas and being so arranged that the total effect of operation on such third combination is to move said support in the opposite direction from said first combination but at a different speed from that produced by the latter.

11. Apparatus according to claim 10, including means whereby working fluid may be fed from said reservoir at a constant volume rate to a fourth combination of one face of one piston and one face of the other piston which will both urge said support in the same direction, such direction being opposite to the direction of movement produced by operation on said first combination.

12. Apparatus according to claim 11, wherein the difference between the effective areas of the pair of piston faces of said third combination is small compared with the sum of the effective areas of the pair of piston faces of said fourth combination, whereby operation on said third combination causes movement of said support at a speed substantially greater than operation on said fourth combination.

13. Apparatus according to claim 11, including two valve assemblies adapted to control the delivery of working fluid to the combinations of piston faces, the arrangement of such valve assemblies being such that one assembly controls the direction of movement of said support whilst the other controls its speed.

References Cited in the file of this patent

UNITED STATES PATENTS

| | | |
|---|---|---|
| 992,852 | Cheney | May 23, 1911 |
| 2,470,415 | Seborg | May 17, 1949 |
| 2,800,111 | Schnurr et al. | July 23, 1957 |
| 2,916,205 | Litz | Dec. 8, 1959 |
| 3,017,865 | Franz et al. | Jan. 23, 1962 |